(12) United States Patent
Cheng et al.

(10) Patent No.: US 8,367,775 B2
(45) Date of Patent: Feb. 5, 2013

(54) MODIFIED CONJUGATED DIENE-VINYL AROMATIC COPOLYMER AND METHOD FOR MANUFACTURING THE SAME

(75) Inventors: Kuei-Lun Cheng, Tainan (TW); Chen-Pao Huang, Tainan (TW)

(73) Assignee: Chi Mei Corporation, Tainan (TW)

( * ) Notice: Subject to any disclaimer, the term of this patent is extended or adjusted under 35 U.S.C. 154(b) by 0 days.

(21) Appl. No.: 13/339,829

(22) Filed: Dec. 29, 2011

(65) Prior Publication Data

US 2012/0172526 A1 Jul. 5, 2012

(30) Foreign Application Priority Data

Dec. 31, 2010 (TW) .............................. 99147329 A

(51) Int. Cl.
*C08F 8/00* (2006.01)
*C08F 136/00* (2006.01)

(52) U.S. Cl. ........ 525/192; 525/193; 525/194; 525/198; 525/331.9; 525/326.1

(58) Field of Classification Search .................. 525/192, 525/193, 194, 198, 331.9, 326.1
See application file for complete search history.

(56) References Cited

U.S. PATENT DOCUMENTS

| 4,396,751 | A | * | 8/1983 | Kampf et al. ................. 526/279 |
| 4,647,625 | A | * | 3/1987 | Aonuma et al. ............. 525/232 |
| 5,189,109 | A | * | 2/1993 | Imai et al. .................... 525/296 |
| 5,219,938 | A | * | 6/1993 | Imai et al. ..................... 525/102 |
| 5,508,333 | A | * | 4/1996 | Shimizu ....................... 524/424 |
| 5,821,290 | A | * | 10/1998 | Labauze ....................... 524/188 |
| 7,041,761 | B2 | * | 5/2006 | Halasa et al. ................. 526/279 |
| 7,342,070 | B2 | * | 3/2008 | Tsukimawashi et al. ..... 525/105 |
| 7,534,839 | B2 | * | 5/2009 | Lawson et al. ............. 525/331.9 |
| 7,781,533 | B2 | * | 8/2010 | Ozawa et al. .............. 525/331.9 |
| 8,071,682 | B2 | * | 12/2011 | Maeda et al. ................. 525/102 |
| 8,110,635 | B2 | * | 2/2012 | Maeda et al. ................. 525/375 |
| 2005/0203251 | A1 | * | 9/2005 | Oshima et al. ................ 525/192 |
| 2006/0004143 | A1 | * | 1/2006 | Inagaki et al. ................ 525/192 |
| 2008/0027171 | A1 | * | 1/2008 | Yan et al. ..................... 524/612 |
| 2008/0051552 | A1 | * | 2/2008 | Luo et al. ..................... 528/378 |
| 2008/0103252 | A1 | * | 5/2008 | Brumbaugh et al. ......... 524/612 |
| 2008/0146745 | A1 | * | 6/2008 | Luo et al. ..................... 525/342 |
| 2008/0289740 | A1 | * | 11/2008 | Mori et al. .................... 152/450 |
| 2009/0043055 | A1 | * | 2/2009 | Luo et al. ...................... 526/66 |
| 2009/0163668 | A1 | * | 6/2009 | Yamada et al. ............ 525/331.9 |
| 2009/0203826 | A1 | * | 8/2009 | Rachita et al. ................ 524/445 |
| 2009/0203843 | A1 | * | 8/2009 | Fukuoka et al. .............. 525/105 |
| 2010/0280217 | A1 | * | 11/2010 | Luo et al. ..................... 528/319 |
| 2012/0059112 | A1 | * | 3/2012 | Luo et al. ..................... 524/572 |
| 2012/0172527 | A1 | * | 7/2012 | Huang et al. ................. 525/102 |

\* cited by examiner

*Primary Examiner* — Robert S Loewe

(74) *Attorney, Agent, or Firm* — McClure, Qualey & Rodack, LLP

(57) ABSTRACT

A modified conjugated diene-vinyl aromatic copolymer and a method for manufacturing the same are provided. The modified conjugated diene-vinyl aromatic copolymer is formed by modifying a conjugated diene-vinyl aromatic copolymer by reacting with a first modifier in a solvent and then reacting with a second modifier. The solvent includes an organic alkali metal initiator.

31 Claims, No Drawings

MODIFIED CONJUGATED DIENE-VINYL AROMATIC COPOLYMER AND METHOD FOR MANUFACTURING THE SAME

This application claims the benefit of Taiwan application Serial No. 99147329, filed on Dec. 31, 2010, the subject matter of which is incorporated herein by reference.

BACKGROUND OF THE INVENTION

1. Field of the Invention

The invention relates to a modified conjugated diene-vinyl aromatic copolymer and a method for manufacturing the same, and more particularly to a conjugated diene-vinyl aromatic copolymer highly compatible with silica and a method for manufacturing the same.

2. Description of the Related Art

Conjugated diene-vinyl aromatic copolymer can be used as a material for manufacturing tires. For tiress, rolling resistance and wet skid are crucial factors to save energy consumption and increase driving safety. Currently, carbon black is added to the conjugated diene-vinyl aromatic copolymer to increase the strength of the tires. In recent years, due to the depletion of oil resource and the global warming issue, the tire industries replace carbon black with silica with an aim of improving the rolling resistance of the tires and therefore reduce energy loss. In comparison with carbon black, silica is more difficult to be uniformly distributed in conjugated diene-vinyl aromatic copolymer. Therefore, the compatibility between silica and conjugated diene-vinyl aromatic copolymer needs to be further increased. According to one improvement method, when adding silica to the conjugated diene-vinyl aromatic copolymer during the manufacturing process of tires, a modifier is used to perform blending. However, such blending modification normally does not do much good in copolymer modification due to non-unformed distribution and poor reaction. To the worse, after long duration of storage, the residual un-reacted modifier may even jeopardize the properties of the substances. Therefore, how to provide conjugated diene-vinyl aromatic copolymer with silica well distributed in and a method for manufacturing the same has become a prominent task for the industries.

SUMMARY OF THE INVENTION

The invention is directed to a modified conjugated diene-vinyl aromatic copolymer and a method for manufacturing the same. The modified conjugated diene-vinyl aromatic copolymer is highly compatible with silica, has excellent performance in wet skid resistance and rolling resistance after being mixing with silica, and helps to reduce energy loss for vehicles.

According to a first aspect of the present invention, a method for manufacturing modified conjugated diene-vinyl aromatic copolymer is provided. The method for manufacturing modified conjugated diene-vinyl aromatic copolymer comprises modifying a conjugated diene-vinyl aromatic copolymer by reacting with a first modifier in a solvent and then reacting with a second modifier. The solvent comprises an organic alkali metal initiator. The first modifier is expressed as chemical formula (I):

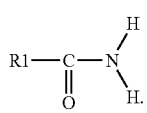

The second modifier is expressed as chemical formula (II):

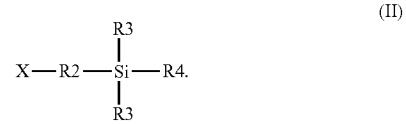

R1 is selected from one of hydrogen, —CH2NH2, —CH=CH2, —(CH2) 2CONH2, —CH=CHCONH2, —C6H4-CONH2 or —CONH2. X is selected from one of epoxypropoxy group, isocyanate group or 2-(3,4-epoxycyclohexyl group). R2 is selected from one of alkyl group with 2~3 carbon atoms. R3 is selected from one of alkoxy group with 1~3 carbon atoms. R4 is selected from one of alkyl group or alkoxy group with 1~3 carbon atoms.

According to a second aspect of the present invention, a modified conjugated diene-vinyl aromatic copolymer is provided. The modified conjugated diene-vinyl aromatic copolymer is formed by modifying a conjugated diene-vinyl aromatic copolymer by reacting with a first modifier in a solvent and then reacting with a second modifier. The solvent comprises an organic alkali metal initiator. The first modifier is expressed as chemical formula (I):

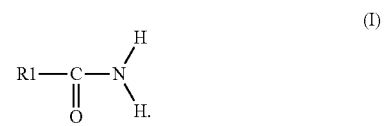

The second modifier is expressed as chemical formula (II):

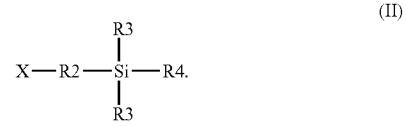

R1 is selected from one of hydrogen, —CH2NH2, —CH=CH2, —(CH2) 2CONH2, —CH=CHCONH2, —C6H4-CONH2 or —CONH2. X is selected from one of epoxypropoxy group, isocyanate group or 2-(3,4-epoxycyclohexyl group). R2 is selected from one of alkyl with 2~3 carbon atoms. R3 is selected from one of alkoxy group with 1~3 carbon atoms. R4 is selected from one of alkyl group or alkoxy group with 1~3 carbon atoms.

According to the supplier side, a modified conjugated diene-vinyl aromatic copolymer is provided. The modified conjugated diene-vinyl aromatic copolymer is formed by modifying a conjugated diene-vinyl aromatic copolymer by reacting with a first modifier in a solvent and then reacting with a second modifier. The solvent comprises an organic alkali metal initiator. The first modifier is expressed as chemical formula (I):

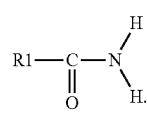

The second modifier is expressed as chemical formula (II):

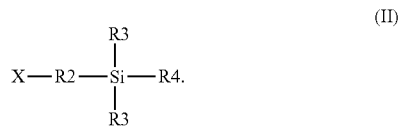

(II)

R1 is selected from one of hydrogen, —CH2NH2, —CH=CH2, —(CH2) 2CONH2, —CH=CHCONH2, —C6H4-CONH2 or —CONH2. X is selected from one of epoxypropoxy group, isocyanate group or 2-(3,4-epoxycyclohexyl group). R2 is selected from one of alkyl group with 2~3 carbon atoms. R3 is selected from one of alkoxy group with 1~3 carbon atoms. R4 is selected from one of alkyl group or alkoxy group with 1~3 carbon atoms.

A mole of the first modifier is substantially equal to a mole of the organic alkali metal initiator. A mole of the second modifier is substantially equal to the mole of the organic alkali metal initiator.

The above and other aspects of the invention will become better understood with regard to the following detailed description of the preferred but non-limiting embodiment(s). The following description is made with reference to the accompanying drawings.

BRIEF DESCRIPTION OF THE DRAWINGS

None

DETAILED DESCRIPTION OF THE INVENTION

A rubber composition made from a modified conjugated diene-vinyl aromatic copolymer manufactured according to embodiments in the invention has excellent performance in wet skid and rolling resistance, and can be used for manufacturing tires. Also, during the process of manufacturing the modified conjugated diene-vinyl aromatic copolymer, there is no need for large scale heating and high-temperature solution, and energy cost is thus greatly reduced in the manufacturing process.

In embodiments of the invention, the modified conjugated diene-vinyl aromatic copolymer is manufactured by a two-stage method and a three-stage method. The two-stage method is disclosed below first. Macromolecular polymerization is applied to a first mixture to obtain a second mixture. The first mixture comprises an organic alkali metal initiator, a conjugated diene monomer and a vinyl aromatic hydrocarbon monomer. The second mixture in the manufacturing method of the present embodiment comprises, for example, a conjugated diene-vinyl aromatic copolymer with active terminal. The conjugated diene-vinyl aromatic copolymer comprises a conjugated diene monomer unit and a vinyl aromatic hydrocarbon monomer unit.

The vinyl aromatic hydrocarbon monomer may comprise styrene, α-methyl styrene or a combination thereof. The conjugated diene monomer may comprise 1,3-butadiene, isoprene, 1,3-pentadiene, 2-ethyl-1,3-butadiene, 2,3-dimethyl butadiene, 2-methyl pentadiene, 4-methyl pentadiene, 2,4-hexadiene or a combination thereof. In the polymerization reaction, the conjugated diene monomers are polymerized to have a 1,4-structure obtained from 1,4-polymerization and a 1,2-structure obtained from 1,2-polymerization. The 1,4-structure and the 1,2-structure may co-exist in a molecular chain. The 1,4-structure can be further divided into a cis-structure and a trans-structure. The 1,2-structure is a structure having a vinyl group at the side chain. The vinyl(1,2) structure amounts to 20%~70% of the conjugated diene monomer unit of the polymerized copolymer. In some embodiments, the vinyl(1,2) structure amounts to 55%~70% (preferably 63%) of the conjugated diene monomer unit. The conjugated diene monomer unit amounts to 75 wt. %~85 wt. % (preferably wt. 79%) of the conjugated diene-vinyl aromatic copolymer. The vinyl aromatic hydrocarbon monomer unit amounts to 15 wt. %~25 wt. % (preferably 21 wt. %) of the conjugated diene-vinyl aromatic copolymer. In other embodiments, if the vinyl (1,2) structure amounts to 20%~40% (preferably 30%) of the conjugated diene monomer unit, the conjugated diene monomer unit amounts to 80 wt. %~90 wt. % (preferably 85 wt. %) of the conjugated diene-vinyl aromatic copolymer. and the vinyl aromatic hydrocarbon monomer unit amounts to 10 wt. %~20 wt. % (preferably 15 wt. %) of the conjugated diene-vinyl aromatic copolymer.

In one embodiment, conjugated diene is 1,3-butadiene, and vinyl aromatic hydrocarbon is styrene.

A total weight of conjugated diene and vinyl aromatic hydrocarbon monomer:a weight of organic alkali metal initiator is: 100:0.01~0.5. The organic alkali metal initiator comprises ethyl lithium, n-propyl lithium, isopropyl lithium, n-butyllithium, n-pentyl lithium, phenyl lithium, tolyl lithium or a combination thereof.

In some embodiments, the first mixture may further comprise a solvent and a micro-structure modifier. The solvent used in the manufacturing method of the present embodiment can also be realized by a non-polar solvent of such as a saturated hydrocarbon and an aromatic hydrocarbon but is not limited thereto. The solvent may use an aliphatic hydrocarbon (such as pentane, hexane, heptane, and so on), an alicyclic hydrocarbon (such as cyclopentane, cyclohexane, methyl cyclopentane, methyl cyclohexane, and so on), an aromatic hydrocarbon (such as benzene, toluene, xylene, and so on), or a combination thereof. In the polymerization process of the present embodiment, for enabling the vinyl aromatic hydrocarbon monomer compound and the conjugated diene monomer compound to be randomly copolymerized, a small amount of polar compound (also referred as micro-structure modifier) can be added as a vinylating agent. Such polar compound can also be realized by an ether (such as tetrahydrofuran, diethyl ether, dioxane, 1,2-dimethcmethane, 1,2-dibutoxyethane, diethylene glycol dimethyl ether, diethylene glycol dibutyl ether, dimethoxybenzene, 2,2-ditetrahydrofurylpropane (DTHFP) and so on), a tertiary amine (such as tetramethylethylenediamine, dipiperidine ethane, trimethylamine, triethylamine, pyridine, quinuclidine and so on), an alkali metal alkyl alcoholate (such as potassium tert-pentoxide, potassium tert-butoxide, sodium tert-butoxide, sodium tert-pentoxide and so on), a phosphine compound (such as triphenylphosphine and so one), an alkyl or aryl sulfonic acid compound and so on. These polar compounds can be used individually or as a combination of two or more compounds.

In one embodiment, a usage amount of micro-structure modifier is based on target objects and effects. Normally, the micro-structure modifier has 0.01~100 moles with respect to 1 mole of the initiator. According to an amount of the desired (1,2) ethylene structure, the polar compound (vinylating agent) can be suitably used as a micro-structure regulator for the diene part of the polymer.

Then, the second mixture is modified to obtain a modified conjugated diene-vinyl aromatic copolymer. The method for modifying the second mixture comprises enabling the second mixture to react with the first modifier to obtain a third mixture. Then, the third mixture further reacts with the second modifier.

The first modifier is expressed as chemical formula (I):

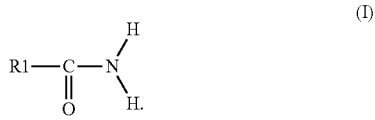

R1 is selected from one of hydrogen, —CH2NH2, —CH=CH2, —(CH2)2CONH2, —CH=CHCONH2, —C6H4-CONH2 or —CONH2. The first modifier can be used as a terminator for terminating the polymerization process of the second mixture. Meanwhile, the first modifier which performs terminal modification on the second mixture can be used as a modifier. In one embodiment, the first modifier is added after the modification of the second mixture is completed. The mole of the first modifier is substantially 0.7~1.3 times of the mole of the organic alkali metal initiator. In some embodiments, the mole of the first modifier is substantially equal to the mole of the organic alkali metal initiator. In some embodiments, the first modifier may comprise formamide, N,N-dimethylformamide, N,N-diethylformamide, acetamide, N,N-dimethylacetamide, N,N-diethylacetamide, aminoacetamide, N,N-dimethyl-N',N'-dimethylaminoacetamide, N',N'-dimethylaminoacetamide, N'-ethylaminoacetamide, N,N-dimethyl-N'-ethylaminoacetamide, N,N-dimethylaminoacetamide, N-phenyldiacetamide, acrylamide, N,N-dimethylmethacrylamide, N,N-dimethyl methyl acrylamide, propionamide, N,N-dimethylpropionamide, 4-pyridylamide, N,N-dimethyl-4-pyridylamide, benzamide, N-ethylbenzamide, N-phenylbenzamide, N,N-dimethylbenzamide, p-aminobenzamide, N',N'-(p-dimethylamino)benzamide, N',N'-(p-diethylamino)benzamide, N'-p-(methylamino)benzamide, N'-(p-ethylamino)benzamide, N,N-dimethyl-N'-(p-ethylamino)benzamide, N,N-dimethyl-N',N'-(p-diethylamino)benzamide, N,N-dimethyl-p-aminobenzamide, N-methyldibenzamide, N-acetyl-N-2-naphthylbenzamide, succinamide, maleinamide, phthalamide, N,N,N',N'-tetramethylmaleinamide, N,N,N',N'-tetramethylphthalamide, succinimide, N-methylsuccinimide, maleimide, N-methylmaleimide, phthalimide, N-methylphthalimide, oxamide, N,N,N',N'-tetramethyloxamide, N,N-dimethyl-p-aminobenzalacetamide, nicotinamide, N,N-diethylnicotinamide, 1,2-cyclohexanedicarboximide, N-methyl-1,2-cyclohexanedicarboximide, methylcarbamate, methyl N-methylcarbamate, ethyl N,N-diethylcarbamate, ethyl carbanilate, ethyl p-N,N-diethylamino-carbanilate, isocyanuric acid, N,N',N''-trimethylisocyanuric acid, a combination thereof or a sulfur compound corresponding to the above compounds.

The second modifier is expressed as chemical formula (II):

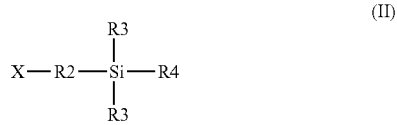

X is selected from one of epoxypropoxy group, isocyanate group or 2-(3,4-epoxycyclohexyl group). R2 is selected from one of alkyl group with 2~3 carbon atoms. R3 is selected from one of alkoxy group with 1~3 carbon atoms. R4 is selected from one of alkyl group or alkoxy group with 1~3 carbon atoms. The second modifier can participate in the modification of the third mixture. Meanwhile, the second modifier which is used as a modifier can perform terminal modification on the third mixture. In one embodiment, the second modifier is added after the modification of the third mixture is completed. The mole of the second modifier is substantially 0.7~1.3 times of the mole of the organic alkali metal initiator. In some embodiments, the mole of the second modifier is substantially equal to the mole of the organic alkali metal initiator. In some embodiments, the second modifier may comprise 2-glycidoxyethyltrimethoxysilane, 2-glycidoxyethyltriethoxysilane, (2-glycidoxyethyl)methyldimethoxysilane, 3-glycidoxypropyltrimethoxysilane, 3-glycidoxypropyltriethoxysilane, methyl(3-glycidoxypropyl)dimethoxysilane, 2-(3,4-epoxycyclohexyl)ethyltrimethoxysilane, 2-(3,4-epoxycyclohexyl)ethyltriethoxysilane, 2-(3,4-epoxycyclohexyl)ethyl(methyl)dimethoxysilane, 3-isocyanatopropyltrimethoxysilane, 3-isocyanatopropyltriethoxysilane, 3-isocyanatopropylmethyldiethoxysilane, 3-isocyanatopropyltriisopropoxysilane or a combination thereof.

In one embodiment, a poor solvent (for example, an alcohol such as methanol, ethanol or isopropyl alcohol) can be added to the terminal-modified conjugated diene-vinyl aromatic copolymer obtained from modification to separate polymers out. Alternatively, hot water or water vapor (hotter than the solvent) can be used to remove the solvent so that the polymers can be separated out. In one embodiment, a polydispersity index (PDI) of the terminal-modified conjugated diene-vinyl aromatic copolymer is substantially 1~3, and an average molecular weight of which is substantially 20000~1000000. The analysis is performed by using the gel permeation chromatography (GPC, made by Waters Company) having the functions for detecting differential curvature detection and light scattering detection.

The processes of the three-stage method are disclosed below. The three-stage method is different from the two-stage method in that: in the two-stage method, a fourth mixture is obtained after the third mixture reacts with the second modifier, and a method of modifying the fourth mixture comprises enabling the fourth mixture to react with the third modifier. The third modifier is expressed as chemical formula (III):

R5 is selected from one of alkyl group, alkoxy group, aromatic group, aroxyl group or cycloalkyl group with 1~12 carbon atoms. R6 is selected from one of alkoxy group or aroxyl group with 1~12 carbon atoms. R7 is selected from one of alkyl group, alkoxy group, aroxyl group or cycloalkyl group with 1~12 carbon atoms. The third modifier can participate in the modification of the fourth mixture. Meanwhile, the third modifier which is used as a modifier performs terminal modification on the fourth mixture. In one embodiment, the third modifier is added after the modification of the fourth mixture is completed. The mole of the third modifier is substantially 0.7~1.3 times of the mole of the organic alkali metal initiator. In some embodiments, the mole of the third modifier is substantially equal to the mole of the organic alkali metal initiator. Thus, the moles of the first modifier, second modifier, and the third modifier are substantially the same and are substantially equal to the mole of the organic alkali metal initiator. The third modifier may comprise tetraethoxysilane, ethyl(trimethoxy)silane, phenyl(tri-n-butoxy) silane, dicyclohexyl(diphenoxy)silane, didecyl(didecoxy)silane, tetradodecoxysilane, tetraphenoxysilane or a combination thereof.

A number of embodiments and comparative examples clearly describe the manufacturing process using various chemical components as modifiers in macromolecular polymerization. Embodiments 1~4 elaborate the modified conjugated diene-vinyl aromatic copolymer manufactured by the two-stage method. Embodiments 5~8 elaborate the modified conjugated diene-vinyl aromatic copolymer manufactured by the three-stage method. Comparative examples 1~4 elaborate the conjugated diene-vinyl aromatic copolymer manufactured by a conventional manufacturing process. The property differences between rubber compositions formed from the modified conjugated diene-vinyl aromatic copolymer manufactured according to these embodiments and comparative examples are further compared. Unless further explanation, in the descriptions for the manufacturing process for the modified conjugated diene-vinyl aromatic copolymer, the unit phr (parts per hundreds of rubber) of a specific substance is defined with respect to 100 weight parts of the whole styrene monomer and butadiene monomer. For example, "0.3 phr of n-butyllithium" refers to 0.3 weight parts of n-butyllithium per 100 weight parts of styrene monomer and butadiene monomer. In the process of manufacturing rubber composition, the unit phr of a specific substance is defined with respect to 100 weight parts of terminal-modified conjugated diene-vinyl aromatic copolymer. For example, "30 phr of silica" refers to 30 weight parts of silica per 100 weight parts of modified styrene-butadiene copolymer.

<Embodiment 1>

Firstly, 800 g of cyclohexane which is used as a solvent are added into a reactor, and a constant temperature of 45° C. is maintained. Next, 0.3 phr of 2,2-ditetrahydrofurylpropane (DTHFP) which is used as a structure modifier are added into the reactor. Then, 0.048 phr of n-butyllithium which is used as an initiator for macromolecular polymerization are added into the reactor. Afterwards, 44.7 g of styrene used as the first monomer and 168.3 g of butadiene used as the second monomer are added into the reactor for macromolecular polymerization, wherein the feeding duration is 50 minutes. After macromolecular polymerization is performed for about 55 minutes, 3.5 phr of butadiene are added and for a polymer chain terminal. Meanwhile, the samples are taken and the solvent of the samples is removed. The vinyl(1,2) structure measured by the infra-red (IR) spectroscopy or nuclear magnetic resonance (NMR) spectroscopy amounts to 63% of the cis-, the trans- and the vinyl structure of the butadiene monomer unit. The macromolecular styrene monomer unit approximately amounts to about 21 wt. % of the overall butadiene monomer unit and styrene monomer unit. After about 5 minutes, formamide whose mole is 1.05 times of that of the initiator is added and mixed for 10 minutes. After that, 3-glycidoxypropyltrimethoxysilane whose mole is 1.05 times of that of the initiator is added and the mixture is discharged after blending for 10 minutes, cyclohexane is removed with hot water, and a conjugated diene-vinyl aromatic copolymer is obtained after the drying process. An average molecular weight of the obtained modified conjugated diene-vinyl aromatic copolymer is 551000. An average molecular number of the modified conjugated diene-vinyl aromatic copolymer is 345000. A polydispersity index (PDI) of the modified conjugated diene-vinyl aromatic copolymer is Mw/Mn=1.6.

<Embodiment 2>

Except that the added 3-glycidoxypropyltrimethoxysilane is replaced by 3-(triethoxysilyl)propylisocyanate, the manufacturing method of embodiment 2 is similar to that of embodiment 1, and the similarities are not repeated. The average molecular weight of the obtained modified conjugated diene-vinyl aromatic copolymer is 485000. The average molecular number of the modified conjugated diene-vinyl aromatic copolymer is 284000. The polydispersity index (PDI) of the modified conjugated diene-vinyl aromatic copolymer is Mw/Mn=1.7.

COMPARATIVE EXAMPLE 1

Except that the added formamide and 3-glycidoxypropyltrimethoxysilane is replaced by methanol, the manufacturing method of comparative example 1 is similar to that of embodiment 1, and the similarities are not repeated. The average molecular weight of the obtained conjugated diene-vinyl aromatic copolymer is 464000. The average molecular number of the conjugated diene-vinyl aromatic copolymer is 328000. The polydispersity index (PDI) of the conjugated diene-vinyl aromatic copolymer is Mw/Mn=1.42.

COMPARATIVE EXAMPLE 2

Except that the added 3-glycidoxypropyltrimethoxysilane is replaced by methanol, the manufacturing method of comparative example 2 is similar to that of embodiment 1, and the similarities are not repeated. The average molecular weight of the obtained formamide-modified conjugated diene-vinyl aromatic copolymer is 500000. The average molecular number of the same is 380000. The polydispersity index (PDI) of the same is Mw/Mn=1.3.

<Embodiment 3>

Firstly, 800 g of cyclohexane used as a solvent is added into a reactor, and a constant temperature of 45□ is maintained. Next, 0.03 phr of 2,2-ditetrahydrofurylpropane (DTHFP) used as a structure modifier is added into the reactor. Then, 0.048 phr of n-butyllithium used as an initiator for macromolecular polymerization is added into the reactor. Afterwards, 26.3 g of styrene used as the first monomer and 149.3 g of butadiene used as the second monomer are added into the reactor for macromolecular polymerization, wherein the feeding duration is 50 minutes. After macromolecular polymerization is performed for about 55 minutes, 3.5 phr of butadiene is added and for a polymer chain terminal. Meanwhile, the sample is taken and the solution of the sample is removed. The vinyl(1,2) structure measured by the infra-red (IR) spectroscopy or nuclear magnetic resonance (NMR) spectroscopy amounts to 30% of the cis- and trans-butadiene monomer unit and the vinyl structure. The macromolecular styrene monomer unit approximately amounts to about 15 wt. % of the overall butadiene monomer unit and styrene monomer unit. After about 5 minutes, formamide whose mole is 1.05 times of that of the initiator is added and mixed for 10 minutes. After that, 3-glycidoxypropyltrimethoxysilane whose mole is 1.05 times of that of the initiator is added and the mixture is discharged after blending for 10 minutes, cyclohexane is removed with hot water, and a conjugated diene-vinyl aromatic copolymer is obtained after the drying process. An average molecular weight of the obtained modified conjugated diene-vinyl aromatic copolymer is 477000. An average molecular number of the modified conjugated diene-vinyl aromatic copolymer is 344000. A polydispersity index (PDI) of the modified conjugated diene-vinyl aromatic copolymer is Mw/Mn=1.39.

<Embodiment 4>

Except that the added 3-glycidoxypropyltrimethoxysilane is replaced by 3-(triethoxysilyl)propylisocyanate, the manufacturing method of embodiment 4 is similar to that of embodiment 3, and the similarities are not repeated. The average molecular weight of the obtained modified conjugated diene-vinyl aromatic copolymer is 489000. The average molecular number of the modified conjugated diene-vinyl aromatic copolymer is 305000. The polydispersity index (PDI) of the modified conjugated diene-vinyl aromatic copolymer is Mw/Mn=1.66.

COMPARATIVE EXAMPLE 3

Except that both the added formamide and 3-glycidoxypropyltrimethoxysilane are replaced by methanol, the manufacturing method of comparative example 3 is similar to that of embodiment 3, and the similarities are not repeated. The average molecular weight of the obtained conjugated diene-vinyl aromatic copolymer is 784000. The average molecular number of the same is 450000. The polydispersity index (PDI) of the same is Mw/Mn=1.74.

COMPARATIVE EXAMPLE 4

Except that the added 3-glycidoxypropyltrimethoxysilane is replaced by methanol, the manufacturing method of comparative example 4 is similar to that of embodiment 3, and the similarities are not repeated. The average molecular weight of the obtained formamide-modified conjugated diene-vinyl aromatic copolymer is 500000. The average molecular number of the modified conjugated diene-vinyl aromatic copolymer is 380000. The polydispersity index (PDI) of the modified conjugated diene-vinyl aromatic copolymer is Mw/Mn=1.3.

Next, rubber compositions are made from the modified conjugated diene-vinyl aromatic copolymers manufactured by the two-stage method according to each example. The properties of each rubber composition are tested. The following ingredients are used for forming the rubber compositions of embodiments 1~4 and comparative examples 1~3:
Silica (made by ULTRASIL EVONIK)
Oil (#3, made by CPC Corporation of Taiwan)
Antioxidant (lx-1076, made by CIBA)
Si69 (bi-3-(triethoxysilyl propyl)tetrasulfide, made by Degussa AG)
Zinc oxide (ZnO, made by HA)
Stearic acid (TPSA1865)
Diphenyl guanidine (made by FLEXSYS)
N-cyclohexyl-2-benzothiazolesulphenamide (CBS, made by FLEXSYS)
Sulfur (Triangle Brand)

Firstly, after 700 g of modified conjugated diene-vinyl aromatic copolymers manufactured according to embodiments 1~4 and comparative examples 1~3 are respectively added and blended for 1 minute, 30 phr of silica, 10 phr of oil, 1 phr of antioxidant (lx-1076), 2 phr of zinc oxide, and 2 phr of stearic acid are further added and blended for 1.5 minutes. Then, after 30 phr of silica are added for 1.5 minutes, 2 phr of diphenyl guanidine (DPG) are further added and blended for about 2.5 minutes, and then the mixture is discharged. The above procedure is implemented by a Banbury-type mixer.

Then, after the mixture is aged for 0.5 hours at room temperature, 4.8 phr of silane coupling agent (Si69) are added and well mixed. Then, after the mixture is aged for 24 hours at room temperature, 2 phr of n-cyclohexyl-2-benzothiazolesulphenamide (CBS) and 2 phr of sulfur are added, a rubber composition is obtained accordingly. The above procedure is implemented with a roll-type mixer. In the following disclosure, the properties of the rubber compositions formed by modified conjugated diene-vinyl aromatic copolymers manufactured according to embodiments 1~4 and comparative examples 1~3 are analyzed and compared.

The properties of each rubber composition are measured with a viscoelasticity measuring device (model DMA Q800, made by TA Instruments). The measurement mode is stretching mode, and the measuring frequency is 20 Hz. The objects of measurement include dynamic storage modulus of elasticity (E) and loss tangent (tan δ). When measuring the dynamic storage modulus of elasticity (E), the temperature is set at 60° C., the deformation degree of measurement is 0.5~10%. The dynamic storage modulus difference of elasticity (ΔE') can be obtained by deducting the dynamic storage modulus of elasticity measured when the deformation degree is 10% from the dynamic storage modulus of elasticity measured when the deformation degree is 0.5%. The smaller the value of the dynamic storage modulus difference of elasticity (ΔE') is, the better the compatibility between the rubber composition and silica is. Besides, the temperature rising rate is 3° C. per minute when measuring the loss tangent (tan δ), the loss tangent is measured at the temperature of 0° C. and 60° C., and the measured deformation is 0.045%. At 0° C., the higher the loss tangent is, the better wet skid the rubber composition has. At 60° C., the higher the loss tangent is, the higher rolling resistance the rubber composition has. Detailed measurement data of rubber compositions formed by the terminal-modified conjugated diene-vinyl aromatic copolymers manufactured according to each example are summarized as Table 1 below.

TABLE 1

|  | ΔE' | tan δ (0° C.) | tan δ (60° C.) |
|---|---|---|---|
| Embodiment 1 | 3.6 | 0.971 | 0.058 |
| Embodiment 2 | 4.3 | 0.962 | 0.060 |
| Comparative example 1 | 6.0 | 0.922 | 0.087 |
| Comparative example 2 | 4.8 | 0.942 | 0.070 |
| Embodiment 3 | 4.4 | 0.144 | 0.045 |
| Embodiment 4 | 4.8 | 0.142 | 0.047 |
| Comparative example 3 | 7.4 | 0.140 | 0.063 |

As illustrated in embodiments 1~2 and comparative examples 1~2 in Table 1, the vinyl(1,2) structure amounts to 63% of the cis-, the trans- and vinyl structure of the butadiene monomer unit, which is high vinyl grade. In the measurement results of the examples in which the vinyl(1,2) grade is high, the dynamic storage modulus differences of elasticity (ΔE') are 3.6 and 4.3 for embodiment 1 and embodiment 2, respectively, and both are smaller than the dynamic storage modulus differences of elasticity (ΔE') for comparative example 1 and comparative example 2 which are 6.0 and 4.8 respectively. Such comparison shows that the rubber compositions formed by the modified conjugated diene-vinyl aromatic copolymer manufactured according to embodiments 1~2 are highly compatible with silica. In addition, at 0° C., the measured loss tangents (tan δ) of the rubber compositions formed by the modified conjugated diene-vinyl aromatic copolymer manufactured according to embodiment 1 and embodiment 2 are 0.971 and 0.962 respectively, and both are larger than the loss tangent (tan δ) of the rubber compositions formed by the modified conjugated diene-vinyl aromatic copolymer manufactured according to comparative example 1 and comparative example 2 at 0° C. which are respectively 0.922 and 0.942. Such comparison shows that the rubber compositions formed by the modified conjugated diene-vinyl aromatic copolymers manufactured according to embodiments 1~2 has excellent performance in wet skid. At 60° C., the measured loss tangents (tan δ) of the rubber compositions formed by the modified conjugated diene-vinyl aromatic copolymers manufactured according to embodiment 1 and embodiment 2 are 0.058 and 0.060 respectively, and both are smaller than the loss tangents (tan δ) of the rubber compositions formed by the modified conjugated diene-vinyl aromatic copolymers manufactured according to comparative example 1 and comparative example 2 at 60° C. which are 0.087 and 0.070 respectively. Such comparison shows that the rubber compositions formed by the modified conjugated diene-vinyl aromatic copolymers manufactured according to embodiments 1~2 has excellent performance in rolling resistance.

As illustrated in embodiments 3~4 and comparative example 3 in Table 1, the vinyl(1,2) structure amount to 30% of the cis-, the trans-, and the vinyl structure of the butadiene monomer unit, which is medium grade vinyl. In the measurement results of the examples in which the vinyl(1,2) grade is medium, the dynamic storage modulus differences of elasticity (ΔE') for embodiment 3 and embodiment 4 are 4.4 and 4.8 respectively, and both are far smaller than the dynamic storage modulus difference of elasticity (ΔE') for comparative example 3 which is 7.4. Such comparison shows that the rubber compositions formed by the modified conjugated diene-vinyl aromatic copolymers manufactured according to embodiments 3~4 are highly compatible with silica. In addition, at 0° C., the measured loss tangents (tan δ) of the rubber compositions formed by the modified conjugated diene-vinyl aromatic copolymers manufactured according to embodiments 3~4 are 0.144 and 0.142 respectively, and both are larger than the loss tangent (tan δ) of the rubber composition formed by the modified conjugated diene-vinyl aromatic copolymer manufactured according to comparative example 3 at 0° C. which is 0.140. Such comparison shows that the rubber compositions formed by the modified conjugated diene-vinyl aromatic copolymers manufactured according to embodiments 3~4 has excellent performance in wet skid. At 60° C., the measured loss tangents (tan δ) of the rubber compositions formed by the modified conjugated diene-vinyl aromatic copolymers manufactured according to embodiment 3 and embodiment 4 are 0.045 and 0.047 respectively, and both are smaller than the loss tangent (tan δ) of the rubber composition formed by the modified conjugated diene-vinyl aromatic copolymer manufactured according to comparative example 3 at 60° C. which is 0.063. Such comparison shows that the rubber compositions formed by the modified conjugated diene-vinyl aromatic copolymers manufactured according to embodiments 3~4 has excellent performance in rolling resistance.

<Embodiment 5>

Firstly, 800 g of cyclohexane used as a solvent are added to a reactor, and a constant temperature of 45° C. is maintained. Next, 0.3 phr of 2,2-ditetrahydrofurylpropane (DTHFP) used as a structure modifier are added to the reactor. Then, 0.048 phr of n-butyllithium used as an initiator for macromolecular polymerization are added to the reactor. Afterwards, 44.7 g of styrene used as the first monomer and 168.3 g of butadiene used as the second monomer are added to the reactor for performing a macromolecular polymerization, wherein the feeding duration is 50 minutes. After the macromolecular polymerization is performed for about 55 minutes, 3.5 phr of butadiene monomer used as a polymer chain terminal are added. Meanwhile, the solution is sampled and the solvent is removed. The measurement results obtained by infra-red (IR) or nuclear magnetic resonance (NMR) spectroscopy show that the vinyl(1,2) structure of polymers amounts to 63% of the cis-, the trans-, and the vinyl structure of the butadiene monomer unit. The styrene monomer unit of the polymer approximately amounts to 21% of the overall weight of the butadiene monomer unit and the styrene monomer unit of the polymer. After about 5 minutes, formamide whose mole is 1.05 times of that of the initiator is added and mixed for 10 minutes. After that, 3-glycidoxypropyltrimethoxysilane whose mole is 1.05 times of that of the initiator is added and mixed for 10 minutes. Next, tetraethoxysilane whose mole is 1.05 times of that of the initiator is added and the mixture is discharged after blending for 10 minutes. A modified conjugated diene-vinyl aromatic copolymer is obtained after a drying process in which the cyclohexane is removed with hot water. The average molecular weight of the obtained modified conjugated diene-vinyl aromatic copolymer is 553000, the average molecular number of the same is 355000, and the polydispersity index (PDI) of the molecular weight of the same is Mw/Mn=1.56.

<Embodiment 6>

Except that the added 3-glycidoxypropyltrimethoxysilane is replaced by 3-(triethoxysilyl)propylisocyanate, the manufacturing processes of the present embodiment are similar to that of embodiment 5, and the similarities are not repeated. The average molecular weight of the obtained modified conjugated diene-vinyl aromatic copolymer is 551000, the average molecular number of the same is 371000, and the polydispersity index (PDI) of the molecular weight of the same is Mw/Mn=1.51.

<Embodiment 7>

Firstly, 800 g of cyclohexane used as a solvent are added to a reactor, and a constant temperature of 45° C. is maintained. Next, 0.03 phr of 2,2-ditetrahydrofurylpropane (DTHFP) used as a structure modifier are added to the reactor. Then, 0.048 phr of n-butyllithium used as an initiator for macromolecular polymerization are added to the reactor. Afterwards, 26.3 g of styrene used as the first monomer and 149.3 g of butadiene used as the second monomer are added to the reactor for macromolecular polymerization, wherein the feeding duration is 50 minutes. After a polymerization reaction is performed for about 55 minutes, 3.5 phr of butadiene monomer used as a polymer chain terminal are added. Meanwhile, the solution is sampled and the solvent is removed. The measurement results obtained by infra-red (IR) or nuclear magnetic resonance (NMR) spectroscopy show that the vinyl (1,2) structure of the polymer amounts to 30% of the cis-, the trans- and the vinyl structure of the butadiene monomer unit. The styrene monomer unit of the polymer approximately amounts to 15% of the overall weight of the butadiene monomer unit and the styrene monomer unit of the polymer. After about 5 minutes, formamide whose mole is 1.05 times of that of the initiator is added and mixed for 10 minutes. After that, 3-glycidoxypropyltrimethoxysilane whose mole is 1.05 times of that of the initiator is added and mixed for 10 minutes. Next, tetraethoxysilane whose mole is 1.05 times of that of the initiator is added and the mixture is discharged after blending for 10 minutes. A modified conjugated diene-vinyl aromatic copolymer is obtained after a drying process in which the cyclohexane is removed with hot water. The average molecular weight of the obtained modified conjugated diene-vinyl aromatic copolymer is 468000, the average molecular number of the same is 347000, and the polydispersity index (PDI) of the molecular weight of the same is Mw/Mn=1.35.

<Embodiment 8>

Except that the added 3-glycidoxypropyltrimethoxysilane is replaced by 3-(triethoxysilyl)propylisocyanate, the manufacturing processes of the present embodiment are similar to that of embodiment 7, and the similarities are not repeated. The average molecular weight of the obtained modified conjugated diene-vinyl aromatic copolymer is 481000, the average molecular number of the same is 353000, and the polydispersity index (PDI) of the molecular weight of the same is Mw/Mn=1.36.

Rubber compositions are manufactured from the modified conjugated diene-vinyl aromatic copolymer manufactured according to each example using the three-stage method. The manufacturing method is described as the foregoing, and thus is not described in detail herein. Detailed measurement data of rubber compositions formed by the modified conjugated diene-vinyl aromatic copolymers manufactured according to each example using the three-stage method are summarized as Table 2 below.

TABLE 2

|  | ΔE' | tanδ (0° C.) | tanδ (60° C.) |
|---|---|---|---|
| Embodiment 5 | 3.3 | 0.975 | 0.054 |
| Embodiment 6 | 3.3 | 0.980 | 0.052 |
| Comparative example 1 | 6.0 | 0.922 | 0.087 |
| Comparative example 2 | 4.8 | 0.942 | 0.070 |
| Embodiment 7 | 4.2 | 0.146 | 0.042 |
| Embodiment 8 | 3.9 | 0.150 | 0.039 |
| Comparative example 3 | 7.4 | 0.140 | 0.063 |

In embodiments 5~6 and comparative examples 1~2 in Table 2, the vinyl(1,2) structure amounts to 63% of the cis-, the trans- and the vinyl structure of the butadiene monomer unit, which is high vinyl grade. In the measurement results of the examples in which the vinyl(1,2) grade is high, the dynamic storage modulus differences of elasticity (ΔE') are 3.3 and 3.3 for embodiment 5 and embodiment 6 respectively, and both are smaller than the dynamic storage modulus differences of elasticity (ΔE') for comparative example 1 and comparative example 2 which are 6.0 and 4.8 respectively. Such comparison shows that the rubber compositions formed by the modified conjugated diene-vinyl aromatic copolymer manufactured according to embodiments 5~6 are highly compatible with silica. In addition, at 0° C., the measured loss tangent (tan δ) of the rubber compositions formed by the modified conjugated diene-vinyl aromatic copolymers manufactured according to embodiments 5~6 are 0.975 and 0.980 respectively, and both are larger than the loss tangents (tan δ) of the rubber compositions formed by the modified conjugated diene-vinyl aromatic copolymer manufactured according to comparative examples 1~2 at 0° C. which are respectively 0.922 and 0.942. Such comparison shows that the rubber compositions formed by the modified conjugated diene-vinyl aromatic copolymers manufactured according to embodiments 5~6 have excellent performance in wet skid. At 60° C., the measured loss tangents (tan δ) of the rubber compositions formed by the modified conjugated diene-vinyl aromatic copolymers manufactured according to embodiment 5 and embodiment 6 are 0.054 and 0.052 respectively, and both are smaller than the loss tangents (tan δ) of the rubber compositions formed by the modified conjugated diene-vinyl aromatic copolymers manufactured according to comparative example 1 and comparative example 2 at 60° C., which are 0.087 and 0.070 respectively. Such comparison shows that the rubber compositions formed by the modified conjugated diene-vinyl aromatic copolymers manufactured according to embodiments 5~6 have excellent performance in rolling resistance.

In embodiments 7~8 and comparative example 3 in Table 2, the vinyl(1,2) structure amount to 30% of the cis-, the trans- and the vinyl structure of the butadiene monomer unit, which is medium grade vinyl. In the measurement results of the examples in which the vinyl(1,2) grade is medium, the dynamic storage modulus differences of elasticity (ΔE') for embodiment 7 and embodiment 8 are 4.2 and 3.9 respectively, and both far smaller than the dynamic storage modulus difference of elasticity (ΔE') for comparative example 3 which is 7.4. Such comparison shows that the rubber compositions formed by the modified conjugated diene-vinyl aromatic copolymers manufactured according to embodiments 7~8 are highly compatible with silica. In addition, at 0° C., the measured loss tangents (tan δ) of the rubber compositions formed by the modified conjugated diene-vinyl aromatic copolymers manufactured according to embodiment 7 and embodiment 8 are 0.146 and 0.150 respectively, and both are larger than the loss tangent (tan δ) of the rubber composition formed by the modified conjugated diene-vinyl aromatic copolymer manufactured according to comparative example 3 at 0° C. which is 0.140. Such comparison shows that the rubber compositions formed by the modified conjugated diene-vinyl aromatic copolymers manufactured according to embodiments 7~8 has excellent performance in wet skid. At 60° C., the measured loss tangents (tan δ) of the rubber compositions formed by the modified conjugated diene-vinyl aromatic copolymers manufactured according to embodiment 7 and embodiment 8 are 0.042 and 0.039 respectively, and both are smaller than the loss tangent (tan δ) of the rubber composition formed by the modified conjugated diene-vinyl aromatic copolymer manufactured according to comparative example 3 at 60° C. which is 0.063. Such comparison shows that the rubber compositions formed by the modified conjugated diene-vinyl aromatic copolymers manufactured according to embodiments 7~8 has excellent performance in rolling resistance.

TABLE 3

|  | Wear Resistance (C.C.) | Vinyl Grade | Manufacturing Process |
|---|---|---|---|
| Embodiment 1 | 0.108 | High | Two-Stage |
| Embodiment 2 | 0.117 | High | Two-Stage |
| Embodiment 3 | 0.070 | Medium | Two-Stage |
| Embodiment 4 | 0.086 | Medium | Two-Stage |
| Embodiment 5 | 0.084 | High | Three-Stage |
| Embodiment 6 | 0.081 | High | Three-Stage |
| Embodiment 7 | 0.064 | Medium | Three-Stage |
| Embodiment 8 | 0.061 | Medium | Three-Stage |
| Comparative example 1 | 0.135 | High | — |
| Comparative example 2 | 0.122 | High | One-Stage |
| Comparative example 3 | 0.099 | Medium | — |
| Comparative example 4 | 0.092 | Medium | One-Stage |

The measurement results of wear resistance and scorching time for embodiments 1~8 and comparative examples 1~4 are summarized in Table 3. The wear resistance is measured with an abrasion testing machine GT-7012-D with reference to the measurement using DIN53 516. The size of the specimen is 29 mm (diameter)*12.5 mm (thickness). The smaller the reading of wear resistance is, the better the wear resistance is.

The wear resistances of embodiments 1, 2, 5 and 6 in which the vinyl grade is high are smaller than that of comparative examples 1 and 2. The wear resistances of embodiments 3, 4, 7 and 8 in which the vinyl grade is medium is smaller than the wear resistances of comparative examples 3 and 4. Regardless the vinyl grade is high or low, the rubber compositions formed by the modified conjugated diene-vinyl aromatic copolymers manufactured according to the present embodiments have superior performance in wear resistance than the comparative examples. Detailed analysis shows that embodiment 3 in which 3-glycidoxypropyltrimethoxysilane is used has superior performance in wear resistance when the two-stage modification method is adopted. In addition, embodiment 8 in which 3-(triethoxysilyl)propylisocyanate is used has superior performance in wear resistance when the three-stage modification method is adopted.

In addition, the Mooney viscosity, the tensile strength and the elongation rate at breaking point of the rubber compositions formed by the modified conjugated diene-vinyl aromatic copolymers manufactured according to embodiment 8 and comparative example 3 respectively in which the vinyl grade are both medium are measured. The Mooney viscosity is measured with an MV-2000 instrument with reference to the ASTM D-1646 method at 100° C. for 1+4 minutes. The tensile strength and the elongation rate at breaking point are measured by the ASTM D-412 DieC method. The tensile strength denotes the maximum strength that the test sample can bear when it is stretched. The elongation rate at breaking point denotes the percentage to which the test sample is stretched when bearing the maximum strength.

The measurement results show that the Mooney viscosity of the rubber composition measured in embodiment 8 is 105 and is superior to that measured in comparative example 3 which is 68. The tensile strength of the rubber composition measured in embodiment 8 is 85 Kg/cm2 and is superior to that measured in comparative example 3 which is 65 Kg/cm2. The elongation rate at breaking point of the rubber composition measured in embodiment 8 is 260% and is superior to that measured in comparative example 3 which is 210%.

The vinyl(1,2) structure amounts to 30% of the cis-, the trans- and the vinyl structure of the butadiene monomer unit, is medium grade vinyl. In the measurement results of the example in which the vinyl(1,2) grade is medium, the rubber composition formed by the modified conjugated diene-vinyl aromatic copolymer manufactured by using 3-(triethoxysilyl)propylisocyanate as the second-stage modifier or using tetraethoxysilane as the third-stage modifier will produce larger Mooney viscosity, making the tensile strength and the elongation rate at breaking point even better.

According to the above embodiments of the invention, the blending technology is not used for the modified conjugated diene-vinyl aromatic copolymer and the method for manufacturing the same. The modified conjugated diene-vinyl aromatic copolymer can be obtained through a direct reaction. Therefore, a large amount of energy cost can be saved in the process of manufacturing the modified conjugated diene-vinyl aromatic copolymer. In addition, the modified conjugated diene-vinyl aromatic copolymer obtained by the method of the invention is highly compatible with silica, and has excellent performance in both wet skid and rolling resistance.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for manufacturing a modified conjugated diene-vinyl aromatic copolymer, comprising:
    modifying a conjugated diene-vinyl aromatic copolymer by reacting with a first modifier and then reacting with a second modifier;
    wherein the conjugated diene-vinyl aromatic copolymer is formed by copolymerizing a conjugated diene monomer and a vinyl aromatic hydrocarbon monomer in a solvent containing an organic alkali metal initiator, the first modifier is expressed as chemical formula (I):

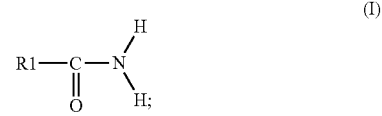

the second modifier is expressed as chemical formula (II):

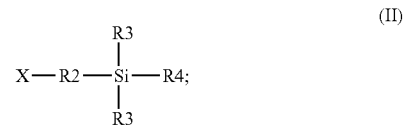

wherein, R1 is selected from one of hydrogen, —CH2NH2, —CH=CH2, —(CH2) 2CONH2, —CH=CHCONH2, —C6H4-CONH2 or-CONH2, X is selected from one of epoxypropoxy group, isocyanate group or 2-(3,4-epoxycyclohexyl group), R2 is selected from one of alkyl group with 2~3 carbon atoms, R3 is selected from one of alkoxy group with 1~3 carbon atoms, and R4 is selected from one of alkyl group or alkoxy group with 1~3 carbon atoms.

2. The method for manufacturing the modified conjugated diene-vinyl aromatic copolymer according to claim 1, wherein the conjugated diene-vinyl aromatic copolymer reacts with a third modifier after reacting with the first modifier and the second modifier;
    wherein the third modifier is expressed as chemical formula (III):

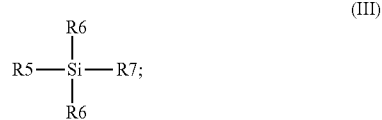

wherein R5 is selected from one of alkyl group, alkoxy group, aromatic group, aroxyl group or cycloalkyl group with 1~12 carbon atoms, R6 is selected from one of alkoxy group or aroxyl group with 1~12 carbon atoms, and R7 is selected from one of alkyl group, alkoxy group, aroxyl group or cycloalkyl group with 1~12 carbon atoms.

3. The method for manufacturing the modified conjugated diene-vinyl aromatic copolymer according to claim 2, wherein the third modifier comprises tetraethoxysilane, ethyl(trimethoxy)silane, phenyl(tri-n-butoxy)silane, dicyclohexyl (diphenoxy)silane, didecyl(didecoxy)silane, tetradodecoxysilane, tetraphenoxysilane or a combination thereof.

4. The method for manufacturing the modified conjugated diene-vinyl aromatic copolymer according to claim 2, wherein the number of moles of the third modifier is about 0.7-1.3 times the number of moles of the organic alkali metal initiator.

5. The method for manufacturing the modified conjugated diene-vinyl aromatic copolymer according to claim 1, wherein the conjugated diene-vinyl aromatic copolymer comprises a conjugated diene monomer unit and a vinyl aromatic hydrocarbon monomer unit, the conjugated diene monomer unit further comprises a vinyl structure, the vinyl structure substantially amounts to 20~70% of the conjugated diene monomer unit of the copolymer.

6. The method for manufacturing the modified conjugated diene-vinyl aromatic copolymer according to claim 5, wherein the conjugated diene monomer unit is a 1,3-butadiene monomer unit, and the vinyl aromatic hydrocarbon monomer unit is a styrene monomer unit.

7. The method for manufacturing the modified conjugated diene-vinyl aromatic copolymer according to claim 6, wherein the vinyl structure substantially amounts to 55~70% of the conjugated diene monomer unit, the conjugated diene monomer unit substantially amounts to 75 wt. %~85 wt. % of the conjugated diene-vinyl aromatic copolymer, and the vinyl aromatic hydrocarbon monomer unit substantially amounts to 15 wt. %~25 wt. % of the conjugated diene-vinyl aromatic copolymer.

8. The method for manufacturing the modified conjugated diene-vinyl aromatic copolymer according to claim 6, wherein the vinyl structure substantially amounts to 20~40% of the conjugated diene monomer unit, the conjugated diene monomer unit substantially amounts to 80 wt. %~90 wt. % of the conjugated diene-vinyl aromatic copolymer, and the vinyl aromatic hydrocarbon monomer unit substantially amounts to 10 wt. %~20 wt. % of the conjugated diene-vinyl aromatic copolymer.

9. The method for manufacturing the modified conjugated diene-vinyl aromatic copolymer according to claim 1, wherein the number of moles of the first modifier is about 0.7-1.3 times the number of moles of the organic alkali metal initiator, and the number of moles of the second modifier is about 0.7-1.3 times the number of moles of the organic alkali metal initiator.

10. The method for manufacturing the modified conjugated diene-vinyl aromatic copolymer according to claim 1, wherein a total weight of the conjugated diene monomer and the vinyl aromatic hydrocarbon monomer:a weight of the organic alkali metal initiator is 100:0.01~0.5.

11. The method for manufacturing the modified conjugated diene-vinyl aromatic copolymer according to claim 1, wherein the second modifier comprises 2-glycidoxyethyltrimethoxysilane, 2-glycidoxyethyltriethoxysilane, (2-glycidoxyethyl)methyldimethoxysilane, 3-glycidoxypropyltrimethoxysilane, 3-glycidoxypropyltriethoxysilane, methyl(3-glycidoxypropyl)dimethoxysilane, 2-(3,4-epoxycyclohexyl) ethyltrimethoxysilane, 2-(3,4-epoxycyclohexyl) ethyltriethoxysilane, 2-(3,4-epoxycyclohexyl)ethyl(methyl) dimethoxysilane, 3-isocyanatopropyltrimethoxysilane, 3-isocyanatopropyltriethoxysilane, 3-isocyanatopropylmethyldiethoxysilane, 3-isocyanatopropyltriisopropoxysilane or a combination thereof.

12. A modified conjugated diene-vinyl aromatic copolymer, wherein the modified conjugated diene-vinyl aromatic copolymer is formed by modifying a conjugated diene-vinyl aromatic copolymer by reacting with a first modifier in a solvent and then reacting with a second modifier, wherein the solvent comprises an organic alkali metal initiator, and the first modifier is expressed as chemical formula (I):

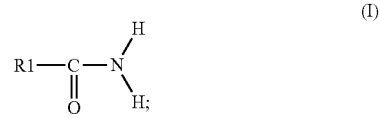

the second modifier is expressed as chemical formula (II):

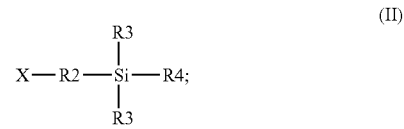

wherein, R1 is selected from one of hydrogen, —CH2NH2, —CH═CH2, —(CH2) 2CONH2, —CH═CHCONH2, —C6H4-CONH2 or —CONH2, X is selected from one of epoxypropoxy group, isocyanate group or 2-(3,4-epoxycyclohexyl) group, R2 is selected from one of alkyl group with 2~3 carbon atoms, R3 is selected from one of alkoxy group with 1~3 carbon atoms, and R4 is selected from one of alkyl group or alkoxy group with 1~3 carbon atoms.

13. The modified conjugated diene-vinyl aromatic copolymer according to claim 12, wherein the conjugated diene-vinyl aromatic copolymer comprises a conjugated diene monomer unit and a vinyl aromatic hydrocarbon monomer unit, and the conjugated diene monomer unit further comprises a vinyl structure, the vinyl structure substantially amounts to 20%~70% of the conjugated diene monomer unit of the conjugated diene-vinyl aromatic copolymer.

14. The modified conjugated diene-vinyl aromatic copolymer according to claim 13, wherein the conjugated diene monomer unit is a 1,3-butadiene monomer unit, and the vinyl aromatic hydrocarbon monomer unit is a styrene monomer unit.

15. The modified conjugated diene-vinyl aromatic copolymer according to claim 13, wherein the vinyl structure substantially amounts to 55%~70% of the conjugated diene monomer unit, the conjugated diene monomer unit substantially amounts to 75 wt. %~85 wt. % of the conjugated diene-vinyl aromatic copolymer, and the vinyl aromatic hydrocarbon monomer unit substantially amounts to 15 wt. %~25 wt. % of the conjugated diene-vinyl aromatic copolymer.

16. The modified conjugated diene-vinyl aromatic copolymer according to claim 13, wherein the vinyl structure substantially amounts to 20~40% of the conjugated diene monomer unit, the conjugated diene monomer unit substantially amounts to 80 wt. %~90 wt. % of the conjugated diene-vinyl aromatic copolymer, and the vinyl aromatic hydrocarbon monomer unit substantially amounts to 10 wt. %~20 wt. % of the conjugated diene-vinyl aromatic copolymer.

17. The modified conjugated diene-vinyl aromatic copolymer according to claim 12, wherein the number of moles of the first modifier is about 0.7-1.3 times the number of moles of the organic alkali metal initiator, and the number of moles of the second modifier is about 0.7-1.3 times the number of moles of the organic alkali metal initiator.

18. The modified conjugated diene-vinyl aromatic copolymer according to claim 17, wherein the conjugated diene-vinyl aromatic copolymer further reacts with a third modifier after reacting with the first modifier and the second modifier, and the third modifier is expressed as chemical formula (III):

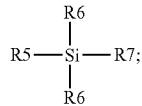
(III)

wherein R5 is selected from one of alkyl group, alkoxy group, aromatic group, aroxyl group or cycloalkyl group with 1~12 carbon atoms, R6 is selected from one of alkoxy group or aroxyl group with 1~12 carbon atoms, and R7 is selected from one of alkyl group, alkoxy group, aroxyl group or cycloalkyl group with 1~12 carbon atoms, wherein the number of moles of the third modifier is about 0.7-1.3 times the number of moles of the organic alkali metal initiator.

19. The modified conjugated diene-vinyl aromatic copolymer according to claim 18, wherein the third modifier comprises tetraethoxysilane, ethyl(trimethoxy)silane, phenyl(tri-n-butoxy)silane, dicyclohexyl(diphenoxy)silane, didecyl(didecoxy)silane, tetradodecoxysilane, tetraphenoxysilane or a combination thereof.

20. The modified conjugated diene-vinyl aromatic copolymer according to claim 12, wherein the second modifier comprises 2-glycidoxyethyltrimethoxysilane, 2-glycidoxyethyltriethoxysilane, (2-glycidoxyethyl)methyldimethoxysilane, 3-glycidoxypropyltrimethoxysilane, 3-glycidoxypropyltriethoxysilane, methyl(3-glycidoxypropyl)dimethoxysilane, 2-(3,4-epoxycyclohexyl)ethyltrimethoxysilane, 2-(3,4-epoxycyclohexyl)ethyltriethoxysilane, 2-(3,4-epoxycyclohexyl)ethyl(methyl)dimethoxysilane, 3-isocyanatopropyltrimethoxysilane, 3-isocyanatopropyltriethoxysilane, 3-isocyanatopropylmethyldiethoxysilane, 3-isocyanatopropyltriisopropoxysilane or a combination thereof.

21. The modified conjugated diene-vinyl aromatic copolymer according to claim 12, wherein the organic alkali metal initiator comprises ethyl lithium, n-propyl lithium, isopropyl lithium, n-butyllithium, n-pentyl lithium, phenyl lithium, tolyl lithium or a combination thereof.

22. The modified conjugated diene-vinyl aromatic copolymer according to claim 12, wherein an average molecular weight of the modified conjugated diene-vinyl aromatic copolymer is about 20,000-1,000,000.

23. The modified conjugated diene-vinyl aromatic copolymer according to claim 12, wherein a polydispersity index (PDI) of the modified conjugated diene-vinyl aromatic copolymer is substantially 1~3.

24. A modified conjugated diene-vinyl aromatic copolymer, which is formed by modifying a conjugated diene-vinyl aromatic copolymer by reacting with a first modifier in a solvent and then reacting with a second modifier, wherein the solvent comprises an organic alkali metal initiator, and the first modifier is expressed as chemical formula (I):

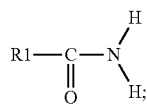
(I)

the second modifier is expressed as chemical formula (II):

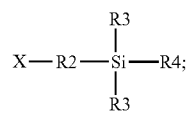
(II)

wherein, R1 is selected from one of hydrogen, —CH2NH2, —CH═CH2, —(CH2)2CONH2, —CH═CHCONH2, —C6H4-CONH2 or —CONH2, X is selected from one of epoxypropoxy group, isocyanate group or 2-(3,4-epoxycyclohexyl group), R2 is selected from one of alkyl group with 2~3 carbon atoms, R3 is selected from one of alkoxy group with 1~3 carbon atoms, and R4 is selected from one of alkyl group or alkoxy group with 1~3 carbon atoms;
wherein the number of moles of the first modifier is substantially equal to the number of moles of the organic alkali metal initiator, and the number of moles of the second modifier is substantially equal to the number of moles of the organic alkali metal initiator.

25. The modified conjugated diene-vinyl aromatic copolymer according to claim 24, wherein the conjugated diene-vinyl aromatic copolymer comprises a 1,3-butadiene monomer unit and a styrene monomer unit.

26. The modified conjugated diene-vinyl aromatic copolymer according to claim 25, wherein the butadiene monomer unit comprises a vinyl structure, the vinyl structure substantially amounts to 55%~70% of the butadiene monomer unit, the butadiene monomer unit substantially amounts to 75 wt. %~85 wt. % of the butadiene-styrene copolymer, and the styrene monomer unit substantially amounts to 15 wt. %~25 wt. % of the butadiene-styrene copolymer.

27. The modified conjugated diene-vinyl aromatic copolymer according to claim 25, wherein the butadiene monomer unit comprises a vinyl structure, the vinyl structure substantially amounts to 20%~40% of the butadiene monomer unit, the butadiene monomer unit substantially amounts to 80 wt. %~90 wt. % of the butadiene-styrene copolymer, and the styrene monomer unit substantially amounts to 10 wt. %~20 wt. % of the butadiene-styrene copolymer.

28. The modified conjugated diene-vinyl aromatic copolymer according to claim 24, wherein the conjugated diene-vinyl aromatic copolymer further reacts with a third modifier after reacting with the first modifier and the second modifier, and the third modifier is expressed as chemical formula (III):

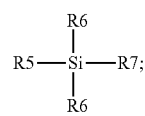
(III)

wherein R5 is selected from one of alkyl group, alkoxy group, aromatic group, aroxyl or cycloalkyl group with 1~12 carbon atoms, R6 is selected from one of alkoxy group or aroxyl group with 1~12 carbon atoms, and R7 is selected from one of alkyl group, alkoxy group, aroxyl group or cycloalkyl group with 1~12 carbon atoms, wherein the number of moles of the third modifier is substantially equal to the number of moles of the organic alkali metal initiator.

29. The modified conjugated diene-vinyl aromatic copolymer according to claim 28, wherein the third modifier is selected from tetraethoxysilane.

30. The modified conjugated diene-vinyl aromatic copolymer according to claim 24, wherein the second modifier is selected from one of 3-glycidoxypropyltrimethoxysilane, 3-glycidoxypropyltriethoxysilane, 3-isocyanatopropyltriethoxysilane or a combination thereof.

31. The modified conjugated diene-vinyl aromatic copolymer according to claim 24, wherein the organic alkali metal initiator comprises ethyl lithium, n-propyl lithium, isopropyl lithium, n-butyllithium, n-pentyl lithium, phenyl lithium, tolyl lithium or a combination thereof.

* * * * *